(12) United States Patent
Sanches et al.

(10) Patent No.: US 8,792,911 B2
(45) Date of Patent: Jul. 29, 2014

(54) NAVIGATION SYSTEM AND METHOD

(75) Inventors: Ricardo F. Sanches, Dundee (GB);
Peter Macmillan, Dundee (GB);
Graham Flett, Dundee (GB)

(73) Assignee: NCR Corporation, Duluth, GA (US)

( * ) Notice: Subject to any disclaimer, the term of this patent is extended or adjusted under 35 U.S.C. 154(b) by 999 days.

(21) Appl. No.: 12/493,607

(22) Filed: Jun. 29, 2009

(65) Prior Publication Data

US 2010/0331014 A1 Dec. 30, 2010

(51) Int. Cl.
*H04W 24/00* (2009.01)
(52) U.S. Cl.
USPC ............... 455/456.3; 455/456.1; 455/456.5; 455/457; 701/433; 701/532
(58) Field of Classification Search
USPC ............... 455/456.1–457; 701/433, 532; 340/12.25, 988
See application file for complete search history.

(56) References Cited

U.S. PATENT DOCUMENTS

| | | | | | |
|---|---|---|---|---|---|
| 4,752,951 | A * | 6/1988 | Konneker | ............... | 379/201.07 |
| 5,131,020 | A * | 7/1992 | Liebesny et al. | ............ | 455/414.3 |
| 6,236,338 | B1 * | 5/2001 | Hamada | ................... | 340/995.1 |
| 6,535,743 | B1 * | 3/2003 | Kennedy et al. | ............ | 455/456.1 |
| 6,842,620 | B2 * | 1/2005 | Smith et al. | ................ | 455/456.1 |
| 6,868,337 | B2 * | 3/2005 | Muramatsu | ................... | 701/431 |
| 7,196,659 | B1 * | 3/2007 | Beason et al. | ............. | 342/357.34 |
| 7,439,878 | B2 * | 10/2008 | Kato et al. | .................... | 340/988 |
| 7,480,567 | B2 * | 1/2009 | Suomela et al. | .............. | 701/428 |
| 7,496,445 | B2 * | 2/2009 | Mohsini et al. | ............... | 701/434 |
| 7,587,274 | B2 * | 9/2009 | Kaldewey et al. | ........... | 701/434 |
| 7,663,502 | B2 * | 2/2010 | Breed | ........................ | 340/12.25 |
| 8,204,684 | B2 * | 6/2012 | Forstall et al. | ................ | 701/433 |
| 8,566,026 | B2 * | 10/2013 | Bouve | ........................... | 701/411 |
| 2004/0153553 | A1 * | 8/2004 | Chotkowski et al. | ........ | 709/229 |
| 2004/0233065 | A1 * | 11/2004 | Freeman | .................. | 340/825.49 |
| 2005/0048987 | A1 * | 3/2005 | Glass | ........................ | 455/456.1 |
| 2005/0261942 | A1 * | 11/2005 | Wheeler | .......................... | 705/3 |
| 2006/0148454 | A1 * | 7/2006 | Welch | ......................... | 455/414.1 |
| 2007/0001904 | A1 * | 1/2007 | Mendelson | ................... | 342/450 |
| 2007/0083428 | A1 * | 4/2007 | Goldstein | ...................... | 705/14 |
| 2007/0090951 | A1 * | 4/2007 | Chan et al. | ................. | 340/572.1 |
| 2007/0173266 | A1 * | 7/2007 | Barnes, Jr. | ................. | 455/456.1 |
| 2007/0197229 | A1 * | 8/2007 | Kalliola et al. | ............ | 455/456.1 |
| 2008/0248815 | A1 * | 10/2008 | Busch | ......................... | 455/456.5 |
| 2009/0171571 | A1 * | 7/2009 | Son et al. | ....................... | 701/208 |
| 2009/0215471 | A1 * | 8/2009 | Sands et al. | .................. | 455/457 |
| 2010/0023249 | A1 * | 1/2010 | Mays et al. | .................... | 701/200 |
| 2010/0211307 | A1 * | 8/2010 | Geelen | ........................... | 701/201 |

* cited by examiner

*Primary Examiner* — Sharad Rampuria
(74) *Attorney, Agent, or Firm* — Paul W. Martin; Harden E. Stevens, III

(57) ABSTRACT

A navigation system and method which provides direction to visitors in buildings or groups of buildings. The system includes a check-in computer for recording identification information and destination information of a person upon entry into a building, for interrogating a wireless communicator associated with the person to obtain a wireless identifier, and for storing the identification information, the destination information, and the wireless identifier in a record. The system further includes a plurality of navigation stations for receiving the wireless identifier along a route of the person, for determining directions to a next navigation station along the route based upon the destination information in the record, and for providing the directions to the person.

17 Claims, 3 Drawing Sheets

NAVIGATION SYSTEM AND METHOD

BACKGROUND

Visitors can easily get lost in buildings or groups of buildings of which they have no familiarity. For example, visitors to hospitals and government agencies may have trouble finding their way to their intended destinations. Visitors may unintentionally end up in restricted or forbidden areas.

Therefore, it would be desirable to provide a navigation system and method to assist visitors in navigating buildings or groups of buildings.

SUMMARY

A navigation system and method is provided.

The system includes a check-in computer for recording identification information and destination information of a person upon entry into a building, for interrogating a wireless communicator associated with the person to obtain a wireless identifier, and for storing the identification information, the destination information, and the wireless identifier in a record. The system further includes a plurality of navigation stations for receiving the wireless identifier along a route of the person, for determining directions to a next navigation station along the route based upon the destination information in the record, and for providing the directions to the person.

DETAILED DESCRIPTION

Figure 1:
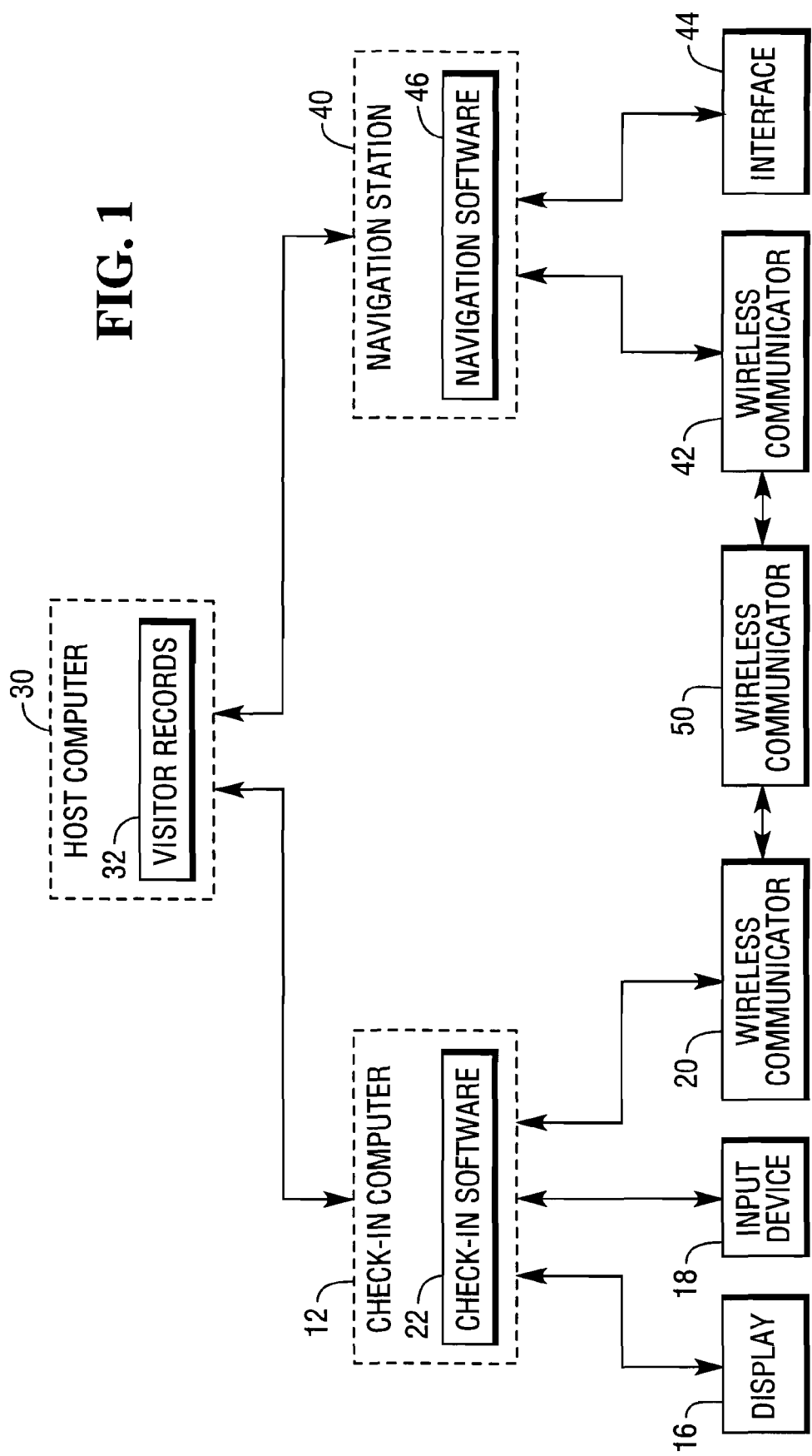
FIG. 1 is a block diagram including an example navigation system.

With reference to FIG. 1, example system 10 primarily includes check-in computer 12.

Check-in computer 12 is coupled to a display 16, input device 18, and wireless communicator 20.

Check-in computer 12 executes check-in software 22, which guides a visitor, patient, customer, or other person through a check-in process. As part of the check-in process, check-in software 22 displays a request for visitor identification information, destination information, and possibly other information. In one example embodiment, a visitor may provide identification information via input device 18, which may include a keyboard or touch screen overlay.

The requested information may take a variety of forms depending on the organization involved. For example, a visitor may be prompted to provide any of a name, an address, a telephone number, appointment information, destination, person intending to visit, personal identification number or the like.

In another example embodiment, check-in computer 12 may be coupled to a card reader and a visitor may provide identification information by swiping an identification card, or a card with identification information, such as a credit card or health insurance card.

In yet another example embodiment, check-in computer 12 may be coupled to a barcode reader or document scanner. A visitor may provide identification information by scanning a document previously provided to the visitor, such as via mail. The document may include a bar code or other computer readable information.

Check-in software 22 also interrogates wireless communicator 50 using wireless communicator 20. In one example embodiment, wireless communicator 20 and wireless communicator 50 may be radio frequency (RF) devices, such as Bluetooth standard devices. For this purpose, wireless communicator 50 may be integrated within a cellular telephone, portable computer, or other portable device. Wireless communicators 20 and 42 may be Bluetooth standard devices.

In another example embodiment, wireless communicator 50 may include an RF identification (RFID) tag. Check-in computer 12 may be coupled to an RFID tag dispenser. For example, RFID tags may be incorporated into cards. Check-in computer 12 may include a card dispenser which dispenses cards containing RFID tags. Wireless communicators 20 and 42 may be RFID tag readers.

Check-in software 22 creates a record associated with the visitor in visitor records 32. Check-in software 22 stores visitor provided information and a unique wireless identifier associated with wireless communicator 50 in the record.

To distinguish one visitor from another, check-in software 22 may assign a differentiator, such as a unique color to visitors when they check in.

Check-in software 22 may also store any authorizations to proceed into restricted areas in visitor records. Restricted areas may include security systems with wireless communicators for interrogating wireless communicator 50 and approving or denying entry based upon the received wireless identifier and the authorizations stored within visitor records 32. The security systems may include door lock control systems which respond to authorized wireless identifiers by unlocking doors.

Check-in computer 12 further includes a processor, memory, and may include additional peripherals. Check-in computer 12 may include an assisted-service terminal or a self-service terminal, such as a kiosk. Check-in computer 12 may be coupled to host computer 30 via wired or wireless network connections, or a combination of the both. The functions of check-in computer 12 and host computer 30 may be combined into one computer.

Example system 10 further includes one or more navigation stations 40 located throughout a building. For purposes of this example, "building" is equivalent to a single building or a plurality of buildings or a complex including buildings.

Navigation station 40 includes a processor, memory, wireless communicator 42, and interface 44, and may include additional peripherals.

Navigation station 40 executes navigation assistance software 46 which causes wireless communicator 42 to interrogate wireless communicator 50 to obtain the wireless identifier and further causes interface 44 to provide a visitor with directions to the destination stored in visitor records 32. For this purpose, navigation assistance software 46 is programmed with possible routes.

Visitors will typically walk, but may also travel in carts, scooters, wheelchairs, or other forms of acceptable transportation within buildings.

To distinguish one visitor from another, navigation software 46 may obtain a visitor differentiator, such as color, from visitor records 32 and display directions intended for that visitor in the visitor's assigned color.

Navigation station 40 may take a variety of forms. One or more forms of navigation station 40 may be located throughout a building or group of buildings. Check-in computer 12 may also function as a navigation station 40.

In one form, navigation station 40 may provide minimal or no capability for visitor input or control. In this form, navigation station 40 may be unobtrusively located. Interface 44 may be a speaker for producing audio directions, a display for graphically displaying directions, or a combination of both. For example, navigation station 40 may be packaged as a large overhead display.

In this form, navigation software 46 may automatically retrieve information from visitor records 32 using the wireless identifier when wireless communicator 50 is in range of wireless communicator 42. For this purpose, navigation station 40 is coupled to host computer 30 via a network. Navigation software 46 then automatically provides further direction to the visitor via interface 44.

For example, navigation software 46 may automatically detect wireless communicator 50, determine the visitors destination, and provide an aural message or a graphic indication, such as an arrow, or both.

Navigation software 46 may also determine a preferred route for a visitor with a detected wireless identifier and further determine that the visitor has not taken the preferred route, for example, because the visitor is lost. Navigation software 46 may provide an aural message or a graphic indication with directions to the next navigation station 40. Navigation software 46 may alternatively summon a person to assist the visitor.

In another form, navigation station 40 may be a self-service terminal or kiosk, similar to check-in computer 12, with full interactive capability. In this form, navigation software 46 may respond to requests for additional assistance from visitors. Interface 44 may include a display and an input device, which may be combined as a touch screen. Navigation software 46 records requests for assistance via the input device.

In this form, navigation software 46 may or may not rely on information within visitor records 32 to identify the visitor. Thus, navigation station may or may not be coupled to host computer 30. Navigation software 46 may additionally prompt the visitor to enter some of the same information entered by the visitor at check-in computer 12.

Figure 2:
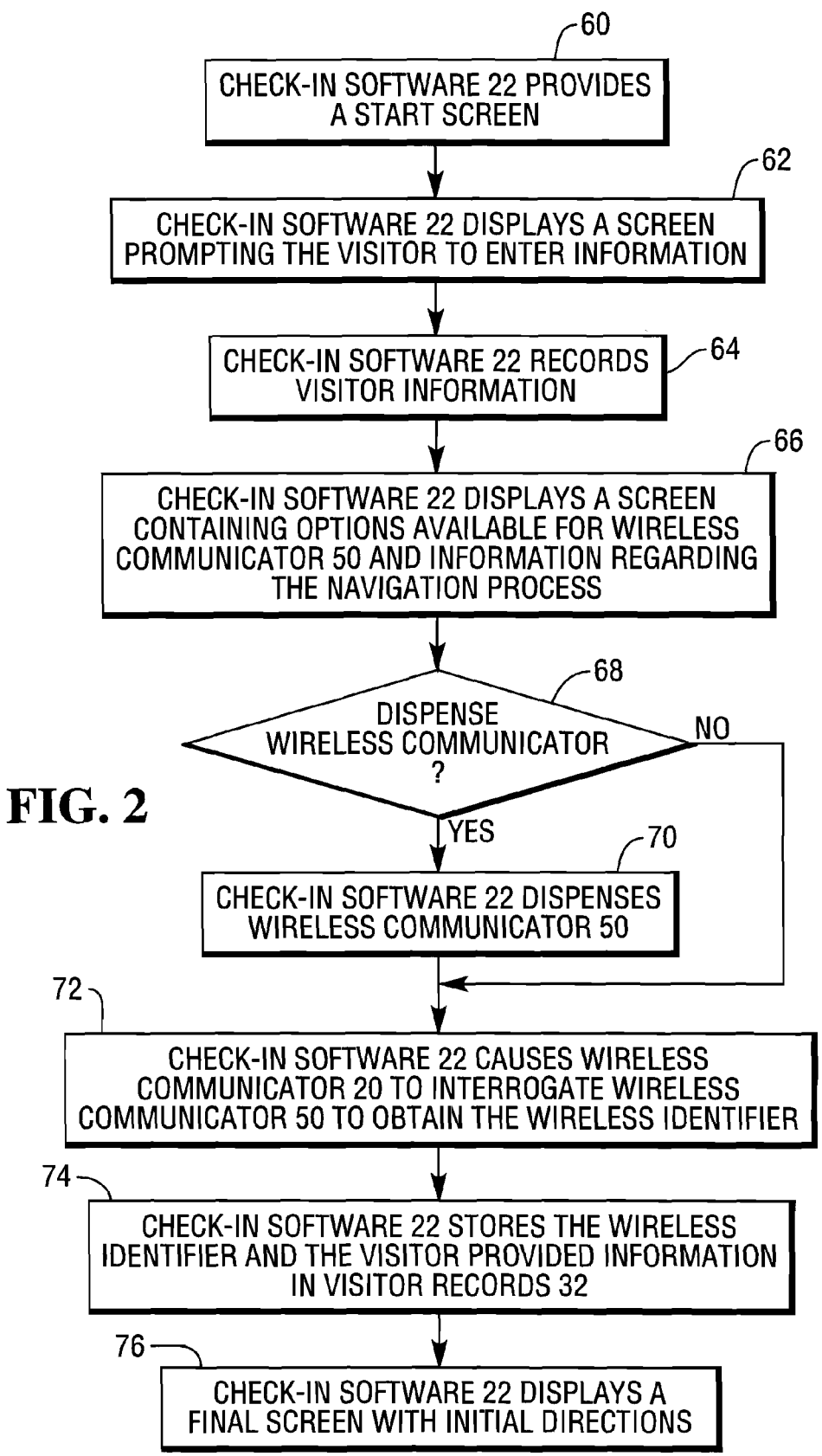
FIG. 2 is a flow diagram illustrating an example check-in process of a navigation method.

With reference to FIG. 2, an example navigation method includes a check-in portion.

In step 60, check-in software 22 provides a start screen. The start screen may include a web page. Check-in computer 12 may execute web browser software for displaying web pages. A visitor chooses an option to begin the check-in process.

In step 62, check-in software 22 displays a screen prompting the visitor to enter information.

In step 64, check-in software 22 records visitor information, including any of a name, an address, a telephone number, appointment information, destination, person intending to visit, personal identification number entered via input device 18 or other peripheral, such as a card reader, bar code reader, or document scanner.

In step 66, check-in software 22 displays a screen containing options available for wireless communicator 50 and information regarding the navigation process, including access to restricted areas, and the operation and locations of navigation stations 40. The options may include requesting that check-in software 22 dispense a wireless communicator 50 or requesting permission to use a visitor provided wireless communicator 50.

In step 68, check-in software 22 records a visitor selection of an option. If the visitor selects to receive a dispensed wireless communicator 50, operation proceeds to step 70. Otherwise, operation proceeds to step 72.

In step 70, check-in software 22 dispenses wireless communicator 50, which may include a card with an embedded RFID tag.

In step 72, check-in software 22 causes wireless communicator 20 to interrogate wireless communicator 50 to obtain the wireless identifier.

In step 74, check-in software 22 stores the wireless identifier and the visitor provided information in visitor records 32.

In step 76, check-in software 22 may determine directions to the destination and display a final screen with initial directions to a navigation station 40 along the route.

Figure 3:
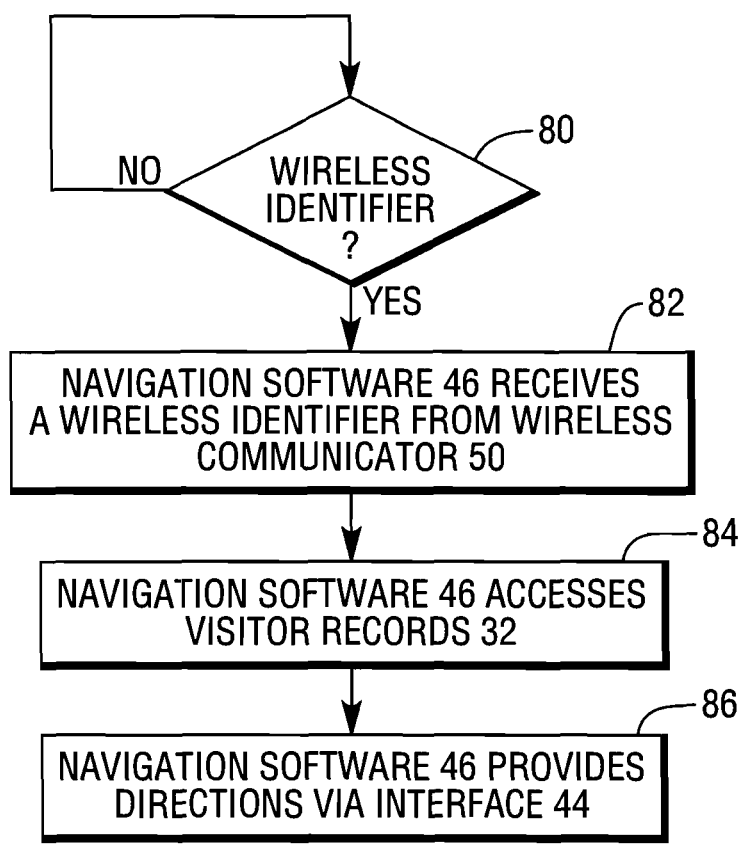
FIG. 3 is a flow diagram illustrating an example navigation method.

With reference to FIG. 3, an example navigation method is illustrated.

In step 80, navigation software 46 waits for wireless communicator 50 to come within a minimum detection range.

In step 82, navigation software 46 receives a wireless identifier from wireless communicator 50.

In step 84, navigation software 46 looks up the wireless identifier and the visitor destination in visitor records 32. Navigation software 46 may also look up a visitor differentiator, such as color. Navigation software 46 may access visitor records 32 automatically upon receiving the wireless identifier or access visitor records 32 under visitor control.

In step 86, navigation software 46 provides directions via interface 44. For example, navigation software 46 may provide directions in audio format, graphic format, or a combination of both formats. Navigation software 46 may modify the audio or graphic format with the visitor differentiator. For example, navigation software 46 may display a directional arrow in a color assigned to the visitor.

Navigation software 46 may provide directions under visitor control, for example, at a kiosk, or automatically provide directions upon receiving the wireless identifier and automatically continue to provide directions until wireless communicator 50 is out of range.

The visitor follows the directions until the visitor reaches the destination or another navigation station 40.

Although particular reference has been made to certain embodiments, variations and modifications are also envisioned within the spirit and scope of the following claims.

What is claimed is:

1. A navigation method comprising:

associating a wireless identifier of a wireless communicator with a person upon entry into a complex including a building or group of buildings, the person having a destination somewhere in the complex, including creating a record associated with the person at a host computer by a check-in computer at a start point of the complex, the record containing a destination of the person and the wireless identifier carried by the person;

storing identification information for the person in the record by the check-in computer;

assigning a differentiator to the person by the check-in computer;

receiving the wireless identifier by a first navigation station located on a route of the person, the route starting at the start point;

determining directions to a second navigation station located on the route by the first navigation station, including using the wireless identifier to identify the record at the host computer, to obtain the destination from the record, and to determine the directions from the first navigation station to the second navigation station based upon the destination; and providing the directions to the person by the first navigation station.

2. The method of claim 1, wherein the wireless communicator comprises a radio frequency identification tag.

3. The method of claim 2, further comprising dispensing the radio frequency identification tag to the person by the check-in computer.

4. The method of claim 1, wherein the wireless communicator comprises a cellular telephone.

5. The method of claim 1, wherein the providing step comprises providing the differentiator with the directions.

6. The method of claim 5, wherein the differentiator comprises a unique color.

7. The method of claim 1, further comprising:
storing authorizations to proceed into restricted areas in the record by the check-in computer.

8. The method of claim 1, wherein the providing step comprises providing aural directions to the person.

9. The method of claim 1, wherein the providing step comprises providing graphic directions to the person.

10. The method of claim 1, wherein the providing step comprises providing a combination of aural and graphic directions to the person.

11. A navigation method comprising:
recording identification information and destination information of a person upon entry into a building by a check-in computer at an entry point in the building, the person having a destination somewhere in the building;
assigning a differentiator to the person by the check-in computer;
dispensing a wireless communicator having a wireless identifier to the person by the check-in computer;
interrogating the wireless communicator to obtain the wireless identifier by the check-in computer;
creating a record associated with the person at a host computer by the check-in computer, the record containing the identification information, the destination information, and the wireless identifier carried by the person;
receiving the wireless identifier by a first navigation station located on a route of the person, the route starting at the check-in computer;
determining directions to a second navigation station located on the route, including using the wireless identifier to identify the record at the host computer, to obtain the destination information from the record, and to determine the directions from the first navigation station to the second navigation station based upon the destination information in the record by the first navigation station; and
displaying the directions to the person by the first navigation station.

12. A navigation system comprising:
a check-in computer at an entry point in a building for recording identification information and destination information of a person upon entry into the building, the person having a destination somewhere in the building, for interrogating a wireless communicator associated with the person to obtain a wireless identifier, for assigning a differentiator to the person by the check-in computer, and for creating a record associated with the person at a host computer, the record containing the identification information, the destination information, and the wireless identifier carried by the person; and
a navigation station located on a route of the person for receiving the wireless identifier, the route starting at the check-in computer, for determining directions to a next navigation station located on the route based upon the destination information in the record, and for providing the directions to the person;
wherein the navigation station uses the wireless identifier to identify the record at the host computer, to obtain the destination information from the record, and to determine the directions from the first navigation station to the second navigation station.

13. The system of claim 12, wherein the check-in computer comprises a kiosk.

14. The system of claim 12, wherein the navigation station comprises a kiosk.

15. The system of claim 12, wherein the wireless communicator comprises a cellular telephone.

16. The system of claim 12, wherein the wireless communicator comprises a radio frequency identification tag.

17. The system of claim 12, wherein the navigation station comprises a display for displaying the directions.

* * * * *